United States Patent Office 3,597,224
Patented Aug. 3, 1971

3,597,224
UPGRADED FLOUR FOR USE IN CAKE
PREPARATION
Norman B. Howard and James B. Martin, Hamilton, Ohio, assignors to The Procter & Gamble Company, Cincinnati, Ohio
No Drawing. Filed Jan. 24, 1969, Ser. No. 793,880
Int. Cl. A21d 2/00, 2/28
U.S. Cl. 99—93                                    5 Claims

ABSTRACT OF THE DISCLOSURE

Monostearin sodium sulfoacetate or propylene glycol monostearate sodium sulfoacetate, in solid ground form, is admixed with lower quality flour to produce a novel upgraded flour composition. The upgraded flour composition is utilized to produce cakes characterized by desirable volume, texture and eating qualities.

BACKGROUND OF THE INVENTION

This invention relates to a novel upgraded flour composition for use in cake preparation and to a method for preparing this composition.

Flour is obtained by processing wheat kernels. A wheat kernel comprises endosperm, bran and germ. The aim in wheat flour manufacture is the separation of endosperm from bran and germ as completely as possible, followed by size reduction of endosperm to a particle size typical of flour. Tempering, breaking, sieving, purification and size-reduction operations are utilized to accomplish these objectives. In the tempering operation, the wheat kernels are treated with water for a time sufficient to increase the toughness and pliableness of the bran coats but insufficient to affect the endosperm. This treatment facilitates the separation of endosperm from bran in the subsequent operations since because of this treatment, the bran does not break up as easily as endosperm in these subsequent operations. Subsequent to this tempering operation the wheat kernels are subjected to a breaking operation. In this operation the tempered wheat kernels are passed between break rolls. The break rolls are pairs of corrugated rolls which rotate toward each other, for example, at a differential speed of about 2.5 to 1. These break rolls crack the kernels and remove chunks of endosperm from the bran. The output from the break rolls is subjected to a sifting and purification operation where the ground material is classified according to particle size by a sifting device and purified to some extent by air separation of the bran particles which are lighter than endosperm particles. The finest and purest material is segregated and is flour. The material of intermediate size and purity is subjected to a size-reduction operation wherein it is passed through pairs of smooth size-reduction rolls revolving toward each other for example at a speed differential of 1.5 to 1 and thereafter the output is subjected to sifting and purification processes to produce flour. The coarsest material emanating from the break rolls and the most impure material (that is the material containing the most bran) is passed through another set of break rolls having finer corrugations than the first set of break rolls. The output from this set of break rolls is subjected to processing similar to the processing undergone by the output from the first set of break rolls. Further breaking, sifting and size-reduction operations are utilized on the coarsest or most impure material. Each breaking or reduction operation yields a certain amount of material with the fineness of flour which goes to make up a "flour stream." Large mills can have 30 to 40 flour streams which are subsequently blended in different ways to give different grades of flour. The resulting streams are often bleached by treatment with an oxidizing agent, e.g. chlorine.

Preferably, flour utilized in cake preparation is very high quality flour. It is often referred to as high grade cake flour, short patent flour, or fancy patent flour. Such flour is referred to herein as high grade cake flour. Ordinarily, this flour is made up of the best quality flour streams, that is, of the flour streams containing the least amount of bran. It amounts to from about 30% to about 50% by weight of the total flour produced. It has been bleached to a pH ranging from about 4 to about 5.

Lower quality flours are also sometimes utilized in cake preparation. These lower quality flours are referred to as, for example, medium patent, long patent, straight grade, and cutoff flours. These lower quality flours are obtained by utilizing flour streams amounting to more than about 50% by weight of the total flour produced or are obtained by blending flour streams other than the best quality streams, that is other than the streams containing the least amounts of bran. Preferably, lower quality flours are bleached, for example with chlorine, to a pH ranging from about 4 to about 5.

Flour are traditionally characterized by ash content and protein content. High grade cake flour has an ash content ranging from about 0.30% to about 0.40% by weight and a protein content ranging from about 7.5% to about 9.5% by weight. Lower quality flours ordinarily have an ash content in excess of about 0.40% and ranging up to about 0.65% by weight; they have protein contents more than about 9.5% and ranging up to about 10.5% by weight.

The ash content of the flour is composed largely of phosphates. Because of this, the higher the ash content is, the higher the phosphate content is. The phosphate contributes to cake batter instability which can result in low volume coarse-grained cakes. Thus, as a result of its lower ash content, high grade cake flour gives higher volume more fine-grain cakes than does the use of lower quality flours in cake preparation.

As a result of its lower protein content, utilizing high grade cake flour results in cakes which are more tender than those produced utilizing lower quality flour. This is partially due to the fact that cake produced from high grade cake flour has fewer protein strands to resist breakage of the cake under shear as compared to cake produced utilizing lower quality flour.

Thus, the use of high grade cake flour in cake preparation produces better results than does the use of lower quality flour. Because it is usually a much lesser proportion of the total flour product than is lower quality flour, high grade cake flour is usually more expensive than lower quality flour.

Thus, it is desirable to utilize lower quality flour in lieu of high grade cake flour to achieve cost and flexibility benefits, if lower quality flour can be upgraded to produce the benefits normally associated with high grade cake flour, that is greater cake volume, finer cake grain structure (that is, better texture), and also more tender cake eating quality.

SUMMARY OF THE INVENTION

It has now been discovered that lower quality flour can be upgraded so as to provide the above-described benefits of high grade cake flour by formulating a novel flour composition comprising lower quality flour and a sulfoacetate upgrading agent additive.

DETAILED DESCRIPTION OF THE INVENTION

The novel flour composition herein comprises lower quality flour and an upgrading agent additive selected from the group consisting of monostearin sodium sulfoacetate, propylene glycol monostearate sodium sulfoacetate and mixtures thereof.

Preferably, the lower quality flour ingredient has been bleached, for example by conventional flour bleaching methods to a pH ranging from about 4 to about 5. Suitable bleaching agents include, for example, chlorine.

Turning now to the upgrading agent additives utilized herein, monostearin sodium sulfoacetate has the formula:

$$C_{17}H_{35}CO_2CH_2CHOHCH_2OCOCH_2SO_2ONa$$

It is conveniently prepared by reacting monostearin with monochloroacetic acid to form monostearin monochloroacetate and converting this product to the sodium sulfoacetate by streckerization with sodium sulfite. A detailed preparation is given in Example I hereinafter.

The upgrading agent additive propylene glycol monostearate sodium sulfoacetate has the formula:

$$C_{17}H_{35}CO_2CH_2CH(CH_3)OCOCH_2SO_2ONa$$

It is conveniently prepared by reacting propylene glycol monostearate with monochloroacetic acid to form propylene glycol monostearate chloroacetate and converting this product to the sodium sulfoacetate by streckerization with sodium sulfite.

The upgrading agents are utilized in the flour composition at levels ranging from about 0.25% to about 2.0% by weight of the flour, preferably at levels ranging from about 0.5% to about 1.0% by weight of the flour.

The upgrading agents are admixed in solid ground form with lower quality flour to produce the novel upgraded flour composition of this invention. The upgrading agents are conveniently ground in any suitable grinding apparatus. For example, a conventional hammermill is a suitable grinding apparatus. In this grinding operation, the upgrading agents are ground to a particle size ranging from about 10 microns to about 50 microns, preferably ranging from about 15 microns to about 25 microns. The ground particles are admixed with and uniformly distributed through the lower quality flour by any convenient method. For example, the ground particles can be admixed with the flour with a Hobart mixer operating at a speed of about 250 r.p.m. with a residence time of about 5 minutes.

Thus, broadly speaking, the novel flour composition herein comprises lower quality flour having uniformly distributed therethrough from about 0.25% to about 2.0% by weight of the flour of solid particulate upgrading agent additive, said upgrading agent additive being selected from the group consisting of monostearin sodium sulfoacetate, propylene glycol monostearate sodium sulfoacetate, and mixtures thereof, the particle size of said upgrading agent additive ranging from about 10 microns to about 50 microns.

This novel upgraded flour composition can be used in any cake preparation process in place of high grade cake flour. When so used it provides benefits of high volume, fine grain structure and tender eating quality.

The following examples further illustrate the preparation of the upgrading agents. They also further illustrate the novel compositions of this invention, their preparation, their use in cake preparation, and the benefits they provide.

EXAMPLE I

Monostearin sodium sulfoacetate upgrading agent is prepared as follows: monostearin (300 g., 0.84 mol) is reacted with monochloroacetic acid (120 g., 1.26 mols) in 400 ml. of toluene. This reaction is carried out by heating at reflux temperatures for two hours with azeotropic removal of water in a moisture trap. The product is diluted with 500 ml. ethyl ether and then is water washed with slight warming. The organic layer from the water washing operation is dried by stirring with 25 g. sodium sulfate. The resulting solution is filtered and the solvent is removed from the filtrate by evaporation. This evaporation operation yields 360 g. of crude monostearin monochloroacetate. 300 g. of this crude monostearin monochloroacetate is then dissolved in 150 ml. of ethanol. Sodium sulfate hepahydrate (250 g.) is dissolved in 300 ml. of water. The ethanol solution is added slowly with stirring to the aqueous solution. The mixture is then stirred at reflux temperatures with slow nitrogen purging for 3 hours. The product is diluted with 3 liters of hexane and is allowed to precipitate at 350° F. for one day. The residue is recovered by filtration and is dried in a vacuum oven at 60° C. and at an absolute pressure of 1 to 5 mm. Hg for 6 hours. The dry residue is extracted with 2 liters of chloroform with warming. The chloroform extract is filtered and the filtrate is evaporated with recovery of over 95% pure monostearin sodium sulfoacetate.

Upgraded flour composition is then prepared as follows. The monostearin sodium sulfoacetate prepared above is ground in a hammermill to a particle size ranging from 15 microns to 25 microns. 2.75 g. of the ground particles are admixed with and uniformly distributed through 500 g. of the straight grade flour with a Hobart mixer operating at a speed of 258 r.p.m. with a residence time of 5 minutes. The straight grade flour ingredient has been bleached to a pH of 4.5 with chlorine by a conventional flour bleaching process. The straight grade flour is analyzed to contain 0.52% by weight ash and 10.0% protein. The resulting upgraded flour composition contains 0.55% monostearin sodium sulfoacetate by weight of the straight grade flour ingredient.

White cakes are then prepared utilizing the above prepared flour composition. These cakes are prepared from the following ingredients:

| Ingredients: | Parts by weight, grams |
|---|---|
| Granulated sugar | 206 |
| Upgraded flour composition | 203 |
| Shortening [1] | 57 |
| Dextrose | 16.8 |
| Nonfat milk solids | 24.4 |
| Salt | 4 |
| Double-acting baking powder | 7.5 |
| Vanilla | 1.3 |
| Egg whites, fresh | 60 |

[1] The shortening is a conventional plastic shortening containing 11% by weight emulsifiers. The emulsifiers are lactic acid ester derived from reaction of soybean mono- and diglycerides with lactic acid, and rapeseed monoglyceride. The shortening contains 8% by weight of the lactic acid ester and 3% by weight of the rapeseed monoglyceride.

The shortening and egg whites are added to a mixture of the rest of the ingredients and then 300 ml. of water is mixed in with an electric mixer at 500 r.p.m. for 4 minutes to provide a batter. 425 g. of batter is placed in an 8-inch round pan and baked at 360° F. for about 25 minutes. The cake volume 20 minutes after removal of the cake from the oven is 1460 cc./425 g. of batter. The cake has a fine texture and a very tender eating quality.

In another case, a white cake is prepared as above except that high grade cake flour is substituted for the upgraded straight grade flour utilized above. This high grade cake flour is analyzed to contain 0.37% by weight ash and 9.12% protein; it has been chlorine-bleached to a pH of 4.7. The cake prepared above utilizing upgraded straight grade flour has approximately equal volume, grain structure, and tenderness qualities to this cake which is prepared from high grade cake flour.

In another case, white cake is prepared as above but with bleached straight grade cake flour which has not been upgraded being utilized instead of the upgraded straight grade flour which is utilized above. The cake volume 20 minutes after removal from the oven is 1040 cc./440 g. of batter and thus is significantly lower than that achieved above with the upgraded straight grade flour. The cake has a significantly coarser texture and tougher eating quality than the cake made above utilizing the upgraded flour.

EXAMPLE II

Propylene glycol monostearate sodium sulfoacetate is prepared as follows:

Propylene glycol monostearate (205 g., 0.46 mol) is reacted with monochloroacetic acid (65 g., 0.68 mol) in 300 ml. of benzene with 0.002 mol of sulfuric acid being present. This reaction is carried out by heating the combination of components at reflux temperatures for 2 hours with azeotropic separation of water. The reaction product is diluted with 500 ml. of ethyl ether and then water washed three times, each time with a 500 ml. portion of water. The organic layer from the water washing is dried by stirring with 25 g. sodium sulfate. The resulting solution is filtered, and solvent is removed by evaporation. The product is crude propylene glycol monostearate chloroacetate, yield 240 g. 210 g. (0.405 mol) of this crude propylene glycol monostearate chloroacetate is reacted with sodium sulfite heptahydrate (176 g., 0.70 mol) in 180 ml. water together with 90 ml. of ethanol. The reactants are heated to reflux temperatures on a steam bath with stirring for 6 hours with a slow stream of nitrogen purging the reaction flask. The resulting product is diluted with 3 liters of hexane, and the sample is allowed to precipitate at 50° F. The precipitate is separated by filtration and then is dissolved in 2 liters chloroform. The chloroform extract is dried by stirring with sodium sulfate and filtering. The clear filtrate is evaporated with recovery of 106 g. of substantially pure propylene glycol monostearate sodium sulfoacetate.

Upgraded flour composition is then prepared as in Example I except that propylene glycol monostearate sodium sulfoacetate is substituted for the monostearin sodium sulfoacetate of Example I.

White cake is prepared from this upgraded flour composition as in Example I except that the upgraded flour composition of this example is utilized instead of the upgraded flour composition of Example I. The cake volume 20 minutes after removal of the cake from the oven is 1250 cc./420 g. batter. The cake has a fine texture and a tender eating quality.

Thus, as in Example I the upgraded cake flour herein approaches the benefits derived from the use of high grade cake flour and is a significant improvement over the use of lower quality flour which has not been upgraded.

Results similar to those achieved in Examples I and II are achieved when mixtures of monostearin sodium sulfoacetate with propylene glycol monostearate sodium sulfoacetate are utilized to upgrade lower quality flour. For example, the use of a mixture of upgrading agents comprising 50% by weight monostearin sodium sulfoacetate and 50% by weight propylene glycol monostearate sodium sulfoacetate provides similar high cake volumes, fine grain structure and tender eating quality to those achieved in Examples I and II.

Results of improved cake volume, fine grain structure and tender eating quality similar to those achieved in Examples I and II are achieved when medium patent, long patent and cutoff flours are substituted for the straight grade flour upgraded in Examples I and II.

What is claimed is:

1. An upgraded flour composition for use in cake preparation, said composition comprising lower quality flour having uniformly distributed therethrough from about 0.25% to about 2.0% by weight of the flour of solid particulate upgrading agent additive, said upgrading agent additive being selected from the group consisting of monostearin sodium sulfoacetate, propylene glycol monostearate sodium sulfoacetate, and mixtures thereof, the particle size of said upgrading agent additive ranging from about 10 microns to about 50 microns.

2. The upgraded flour composition of claim 1 wherein the upgrading agent additive amounts to from about 0.5% to about 1.0% by weight of the flour and has a particle size ranging from about 15 microns to about 25 microns.

3. The upgraded flour composition of claim 2 wherein the lower quality flour is straight grade flour bleached to a pH ranging from about 4 to about 5.

4. The upgraded flour composition of claim 3 wherein the upgrading agent additive is monostearin sodium sulfoacetate.

5. The upgraded flour composition of claim 3 wherein the upgrading agent additive is propylene glycol monostearate sodium sulfoacetate.

References Cited

UNITED STATES PATENTS

| 2,151,805 | 3/1939 | Schei | 99—93 |
|---|---|---|---|
| 2,880,093 | 3/1959 | Kohlmann et al. | 99—93 |
| 3,490,917 | 1/1970 | Doe et al. | 99—93 |

RAYMOND N. JONES, Primary Examiner

U.S. Cl. X.R.

99—92